(12) United States Patent
Rosencrance et al.

(10) Patent No.: US 9,777,434 B2
(45) Date of Patent: Oct. 3, 2017

(54) COMPOSITIONS AND METHODS OF MAKING PAPER PRODUCTS

(75) Inventors: Scott Rosencrance, Douglasville, GA (US); Vladimir Grigoriev, Atlanta, GA (US); Chen Lu, Marietta, GA (US)

(73) Assignee: KEMIRA DYJ, Helsinki (FI)

( * ) Notice: Subject to any disclaimer, the term of this patent is extended or adjusted under 35 U.S.C. 154(b) by 0 days.

(21) Appl. No.: 13/334,866

(22) Filed: Dec. 22, 2011

(65) Prior Publication Data

US 2013/0160959 A1 Jun. 27, 2013

(51) Int. Cl.
| | | |
|---|---|---|
| D21H 17/56 | (2006.01) | |
| D21H 17/47 | (2006.01) | |
| D21H 21/20 | (2006.01) | |
| D21H 23/28 | (2006.01) | |
| C08G 73/02 | (2006.01) | |
| D21H 23/50 | (2006.01) | |

(52) U.S. Cl.
CPC ........... *D21H 17/56* (2013.01); *C08G 73/028* (2013.01); *D21H 17/47* (2013.01); *D21H 21/20* (2013.01); *D21H 23/28* (2013.01); *D21H 23/50* (2013.01)

(58) Field of Classification Search
CPC ...... C07C 51/09; C08G 73/022; C08G 59/10; C08G 59/42; C09J 163/00; D21H 17/54; D21H 17/55; D21H 21/20; D21H 17/56; D21H 17/52
USPC ....... 162/158, 164.1, 164.3, 164.6, 166–167, 162/168.1, 168.2–168.7, 183–185
See application file for complete search history.

(56) References Cited

U.S. PATENT DOCUMENTS

| | | | |
|---|---|---|---|
| 2,926,116 A | 2/1960 | Keim | |
| 2,926,154 A | 2/1960 | Keim | |
| 3,224,990 A | 12/1965 | Babcock | |
| 3,556,932 A | 1/1971 | Coscia et al. | |
| 3,556,933 A | 1/1971 | Williams et al. | |
| 3,951,921 A * | 4/1976 | Espy et al. | 525/430 |
| 4,129,722 A | 12/1978 | Iovine et al. | |
| 4,188,446 A * | 2/1980 | Friedman | 442/59 |
| 4,250,299 A | 2/1981 | Lehmann et al. | |
| 4,319,019 A | 3/1982 | Lehmann et al. | |
| 4,557,801 A * | 12/1985 | Avis | 162/157.6 |
| 4,566,943 A * | 1/1986 | Hansson et al. | 162/168.2 |
| 4,605,702 A | 8/1986 | Guerro et al. | |
| 4,722,964 A * | 2/1988 | Chan et al. | 524/608 |
| 4,788,280 A * | 11/1988 | Billmers et al. | 536/104 |
| 4,845,148 A * | 7/1989 | Moore et al. | 524/512 |
| 4,847,315 A | 7/1989 | Hassler | |
| 5,019,606 A | 5/1991 | Marten et al. | |
| 5,047,642 A | 9/1991 | Pleyber et al. | |
| 5,085,736 A | 2/1992 | Bjorkquist | |
| 5,171,795 A | 12/1992 | Miller et al. | |
| 5,427,652 A * | 6/1995 | Darlington et al. | 162/164.3 |
| 5,614,597 A | 3/1997 | Bower | |
| 5,660,687 A | 8/1997 | Allen et al. | |
| 5,902,862 A | 5/1999 | Allen | |
| 6,224,714 B1 | 5/2001 | Schroeder et al. | |
| 6,274,662 B1 | 8/2001 | Lynch et al. | |
| 6,315,866 B1 * | 11/2001 | Sanchez | 162/168.2 |
| 6,429,253 B1 * | 8/2002 | Guerro et al. | 524/514 |
| 6,908,983 B2 | 6/2005 | Maslanka | |
| 7,081,912 B2 | 7/2006 | Seki et al. | |
| 7,175,740 B2 * | 2/2007 | Riehle et al. | 162/164.3 |
| 7,828,934 B2 | 11/2010 | Cyr et al. | |
| 8,288,502 B2 * | 10/2012 | Bode et al. | 528/246 |
| 9,212,453 B2 * | 12/2015 | Luo et al. | D21H 17/55 |
| 9,506,195 B2 * | 11/2016 | Chen | D21H 17/55 |
| 9,562,326 B2 * | 2/2017 | Lu | D21H 17/47 |
| 2002/0148584 A1 * | 10/2002 | Edwards et al. | 162/204 |
| 2006/0014892 A1 * | 1/2006 | Michel | 524/800 |
| 2006/0124264 A1 | 6/2006 | Kokko et al. | |
| 2006/0183816 A1 | 8/2006 | Gelman et al. | |
| 2007/0056706 A1 * | 3/2007 | Crisp et al. | C08G 73/0286 162/164.3 |
| 2007/0107863 A1 * | 5/2007 | Edwards et al. | 162/111 |
| 2007/0208115 A1 | 9/2007 | Grigoriev et al. | |
| 2008/0308242 A1 | 12/2008 | Lu et al. | |
| 2009/0133846 A1 * | 5/2009 | Grigoriev et al. | 162/112 |
| 2009/0133896 A1 | 5/2009 | Kosaka et al. | |
| 2009/0165978 A1 * | 7/2009 | Hagiopol | C08F 220/56 162/168.3 |
| 2010/0122785 A1 | 5/2010 | Grigoriev et al. | |
| 2011/0146925 A1 * | 6/2011 | Bode et al. | 162/164.1 |
| 2012/0118523 A1 * | 5/2012 | Lu et al. | 162/164.6 |
| 2012/0247697 A1 * | 10/2012 | Lu et al. | 162/111 |
| 2013/0048241 A1 * | 2/2013 | Malmborg et al. | 162/172 |

(Continued)

FOREIGN PATENT DOCUMENTS

| | | |
|---|---|---|
| CN | 101263262 | 9/2008 |
| CN | 102191720 A | 9/2011 |

(Continued)

OTHER PUBLICATIONS

Au et al., "Applications of Wet-End Paper Chemistry," 1995, Blackie Academic & Professional, first edition, pp. 102-119.*
International Search Report and Written Opinion dated Jul. 3, 2012 prepared by Nuki West.
International Search Report and Written Opinion dated Mar. 28, 2013.
Letter reporting Chinese Office Action dated Jul. 8, 2015 from Vidon Shanghai; 2 pages, dated Jul. 21, 2014, regarding Chinese application No. 201280063451.9.
Office Action from the Chinese State Intellectual Property Office dated Jul. 8, 2015, citing CN101263262A, 12 pages.
The Second Chinese Office Action issued by the Chinese State Intellectual Property Office in relation to Chinese Application No. 201280063451.9 dated Feb. 29, 2016 (19 pages) with English Translation (17 pages).

(Continued)

*Primary Examiner* — Jose Fortuna
(74) *Attorney, Agent, or Firm* — Robert P. Michel, Esq.; Carter, DeLuca, Farrell & Schmidt, LLP (57) ABSTRACT

Paper strength systems including polyamine-polyamidoamine-epihalohydrin (PPAE) resin are disclosed. Also disclosed are methods of forming a paper including applying a strength system comprising PPAE to cellulosic fiber, as well as the resultant paper.

19 Claims, 1 Drawing Sheet

(56) References Cited

U.S. PATENT DOCUMENTS

| | | | |
|---|---|---|---|
| 2013/0081771 A1* | 4/2013 | Luo et al. | 162/164.6 |
| 2013/0160959 A1* | 6/2013 | Rosencrance et al. | 162/164.6 |
| 2013/0213593 A1* | 8/2013 | Lu et al. | 162/111 |
| 2014/0060763 A1* | 3/2014 | Bode et al. | 162/164.6 |
| 2014/0124154 A1* | 5/2014 | Simonson | 162/164.6 |
| 2014/0158316 A1* | 6/2014 | Luo et al. | 162/164.3 |
| 2014/0182800 A1* | 7/2014 | Castro et al. | 162/164.6 |
| 2014/0262091 A1* | 9/2014 | Lu et al. | 162/164.6 |
| 2015/0176206 A1* | 6/2015 | Chen | D21H 27/002 162/168.3 |
| 2015/0238650 A1* | 8/2015 | Lu et al. | A61L 15/26 428/220 |
| 2016/0153146 A1* | 6/2016 | Luo | D21H 17/55 162/164.3 |
| 2016/0201267 A1* | 7/2016 | Chen | D21H 27/002 162/164.6 |
| 2016/0281300 A9* | 9/2016 | Lu | D21H 17/47 |
| 2017/0089011 A1* | 3/2017 | Rosencrance | D21H 17/56 |

FOREIGN PATENT DOCUMENTS

| | | | |
|---|---|---|---|
| GB | 2141130 A | | 12/1984 |
| WO | 0011046 A1 | | 3/2000 |
| WO | 0043428 A1 | | 7/2000 |
| WO | 00/50462 A1 | | 8/2000 |
| WO | 0134903 A1 | | 5/2001 |
| WO | 0183887 A1 | | 8/2001 |
| WO | WO2007008945 | | 1/2007 |
| WO | WO 2012135455 A1 | * | 10/2012 |
| WO | WO 2013095952 A1 | * | 6/2013 |

OTHER PUBLICATIONS

Chinese Office Action issued by the State Intellectual Property Office of People's Republic of China in relation to Chinese Application No. 201280063451.9 dated Sep. 2, 2016 (3 pages) along with an English translation (5 pages).

The Fourth Chinese Office Action issued by the Chinese State Intellectual Property Office in relation to Chinese Application No. 201280063451.9 dated Mar. 16, 2017 (14 pages) with English Translation (15 pages).

Rejection Decision issued by the Chinese State Intellectual Property Office in relation to Chinese Patent Application No. 201280063451.9 dated Jul. 4, 2017 (14 pages) along with English language translation (20 pages).

* cited by examiner

COMPOSITIONS AND METHODS OF MAKING PAPER PRODUCTS

BACKGROUND

1. Field of the Art

The present embodiments relate to paper and paper making.

2. Description of Related Art

Paper is sheet material containing interconnected small, discrete fibers. The fibers are usually formed into a sheet on a fine screen from a dilute water suspension or slurry. Paper typically is made from cellulose fibers, although occasionally synthetic fibers are used. Paper products made from untreated cellulose fibers lose their strength rapidly when they become wet, i.e., they have very little wet strength. Wet strength resin can be added to the paper to produce stronger paper products. The types of wet strength resins that can be applied to paper may be either of the "permanent" or "temporary" type, which are defined, in part, by how long the paper retains its wet strength after immersion in water.

A common permanent wet strength resin is an epichlorohydrin-based wet strength resin, such as polyamidoamine epichlorohydrin (PAE). Conventional PAE resins can be prepared by reacting polyamidoamine with epichlorohydrin in the mole ratio of epichlorohydrin to secondary amine groups being from about 0.5 to 1 to about 1.8 to 1 (for example, as discussed in U.S. Pat. Nos. 2,926,116, 2,926,154, U.S. Pat. Nos. 5,171,795, 5,614,597, 5,017,642, 5,019,606, and 7,081,512, each of which is incorporated herein by reference). High permanent wet strength often leads to re-pulping issues during papermaking production. In addition, sanitary paper products with high permanent wet strength may clog sewage systems and/or septic tanks.

Glyoxalated polyacrylamide (GPAM) is a common temporary wet strength resin. GPAM is typically prepared by reacting glyoxal and a cationic polyacrylamide base polymer (for example, as discussed in U.S. Pat. Nos. 3,556,932, 4,605,702, 7,828,934, and U.S. Pat. Application Publication No. 2008/0308242, which are herein incorporated by reference). GPAM is typically added in the pulp suspension before paper sheet formation. Upon drying of the treated paper sheet, GPAM is believed to form covalent bonds with paper cellulose to increase paper dry strength. Since the covalent bond between GPAM and cellulose is reversible in water, this wet strength may decrease over time. GPAM strength performance also can be adversely affected by relatively high pH and high levels of alkalinity when present as bicarbonate ions.

The description herein of certain advantages and disadvantages of known methods and compositions is not intended to limit the scope of the present disclosure. Indeed the present embodiments may include some or all of the features described above without suffering from the same disadvantages.

SUMMARY

In view of the foregoing, one or more embodiments include paper, methods of making paper, compositions, and the like.

At least one embodiment provides a paper formed by a method comprising treatment of a cellulosic fiber with a strength system comprising polyamine polyamidoamine epihalohydrin resin.

At least one embodiment provides a method of making a paper, comprising: introducing to a cellulosic fiber a strength system comprising a polyamine polyamidoamine epihalohydrin resin.

At least one embodiment provides a composition, comprising a mixture of a polyamine polyamidoamine epihalohydrin resin and an aldehyde-functionalized polymer resin, where the weight ratio of aldehyde-functionalized polymer resin to polyamine polyamidoamine epihalohydrin resin is about 100:1 to about 1:100.

DETAILED DESCRIPTION OF THE EMBODIMENTS

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, synthetic organic chemistry, paper chemistry, and the like, which are within the skill of the art. Such techniques are explained fully in the literature.

The examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms and phrases that shall be defined to have the following meanings unless a contrary intention is apparent.

Definitions

The term "substituted" refers to any one or more hydrogens on the designated atom or in a compound that can be replaced with a selection from the indicated group, provided that the designated atom's normal valence is not exceeded, and that the substitution results in a stable compound.

"Acrylamide monomer" refers to a monomer of formula: $H_2C=C(R_1)C(O)NR_2R_3$, where $R_1$ is H or $C_1$-$C_4$ alkyl, $R_2$ and $R_3$ are H, $C_1$-$C_4$ alkyl, aryl or arylalkyl. Exemplary acrylamide monomers include acrylamide and methacrylamide.

"Aldehyde" refers to a compound containing one or more aldehyde (—CHO) groups, where the aldehyde groups are capable of reacting with the amino or amido groups of a polymer comprising amino or amido groups as described herein. Exemplary aldehydes can include formaldehyde, paraformaldehyde, glutaraldehyde, glyoxal, and the like.

"Aliphatic group" refers to a saturated or unsaturated, linear or branched hydrocarbon group and encompasses alkyl, alkenyl, and alkynyl groups, for example.

"Alkyl" refers to a monovalent group derived from a straight or branched chain saturated hydrocarbon by the removal of a single hydrogen atom. Exemplary alkyl groups include methyl, ethyl, n- and iso-propyl, cetyl, and the like.

"Alkylene" refers to a divalent group derived from a straight or branched chain saturated hydrocarbon by the removal of two hydrogen atoms. Exemplary alkylene groups include methylene, ethylene, propylene, and the like.

"Amido group" and "amide" refer to a group of formula —C(O)NY$_1$Y$_2$, where Y$_1$ and Y$_2$ are independently selected from H, alkyl, alkylene, aryl and arylalkyl.

"Amino group" and "amine" refer to a group of formula —NY$_3$Y$_4$, where Y$_3$ and Y$_4$ are independently selected from H, alkyl, alkylene, aryl, and arylalkyl.

"Aryl" refers to an aromatic monocyclic or multicyclic ring system of about 6 to about 10 carbon atoms. The aryl is optionally substituted with one or more $C_1$-$C_{20}$ alkyl, alkylene, alkoxy, or haloalkyl groups. Exemplary aryl groups include phenyl or naphthyl, or substituted phenyl or substituted naphthyl.

"Arylalkyl" refers to an aryl-alkylene-group, where aryl and alkylene are defined herein. Exemplary arylalkyl groups include benzyl, phenylethyl, phenylpropyl, 1-naphthylmethyl, and the like.

"Alkoxy" refers to an alkyl group as defined above with the indicated number of carbon atoms attached through an oxygen bridge. Exemplary alkoxy groups include methoxy, ethoxy, n-propoxy, i-propoxy, n-butoxy, s-butoxy, t-butoxy, n-pentoxy, and s-pentoxy.

"Halogen" refers to fluorine, chlorine, bromine, or iodine.

"Dicarboxylic acid compounds" includes organic aliphatic and aromatic (aryl) dicarboxylic acids and their corresponding acid chlorides, anhydrides and esters, and mixtures thereof. Exemplary dicarboxylic acid compounds include maleic acid, succinic acid, glutaric acid, adipic acid, pimelic acid, suberic acid, azelaic acid, sebasic acid, phthalic acid, isophthalic acid, terephthalic acid, naphthalenedicarboxylic acid, dimethyl maleate, dimethyl malonate, diethyl malonate, dimethyl succinate, di-isopropyl succinate, dimethyl glutarate, diethyl glutarate, dimethyl adipate, methyl ethyl adipate, dimethyl sebacate, dimethyl phthalate, dimethyl isophthalate, dimethyl terephthalate, dimethyl naphthalenedicarboxylate, dibasic esters (DBE), poly(ethylene glycol)bis(carboxymethyl)ether, succinyl chloride, glutaryl dichloride, adipoyl chloride, sebacoyl chloride, sebacate, phthaloyl chloride, isophthaloyl chloride, terephthaloyl chloride, naphthalenedicarboxylate, maleic anhydride, succinic anhydride, glutaric anhydride, phthalic anhydride, 1,8-naphthalic anhydride, and the like.

"Polyalkylene polyamine" can include polyamines such as polyethylene polyamine, polypropylene polyamine, and polyoxybutylene polyamine. In an embodiment, "polyalkylene polyamines" refers to those organic compounds having two primary amine (—NH$_2$) groups and at least one secondary amine group, where the amino nitrogen atoms are linked together by alkylene groups, provided no two nitrogen atoms are attached to the same carbon atoms. Exemplary polyalkylene polyamines include diethylenetriamine (DETA), triethylenetetraamine (TETA), tetraethylenepentaamine (TEPA), dipropylenetriamine, and the like.

"Polyamidoamine" refers to a condensation product of one or more of the polycarboxylic acids and/or a polycarboxylic acid derivative with one or more of a polyalkylene polyamine.

"Paper strength" means a property of a paper material, and can be expressed, inter alia, in terms of dry strength and/or wet strength. Dry strength is the tensile strength exhibited by the dry paper sheet, typically conditioned under uniform humidity and room temperature conditions prior to testing. Wet strength is the tensile strength exhibited by a paper sheet that has been wetted with water prior to testing.

As used herein, the terms "paper" or "paper product" (these two terms can be used interchangeably herein) is understood to include a sheet material that contains paper fibers, which may also contain other materials. Suitable paper fibers include natural and synthetic fibers, for example, cellulosic fibers, wood fibers of all varieties used in papermaking, other plant fibers, such as cotton fibers, fibers derived from recycled paper; and the synthetic fibers, such as rayon, nylon, fiberglass, or polyolefin fibers. The paper product may be composed only of synthetic fibers. Natural fibers may be mixed with synthetic fibers. For instance, in the preparation of the paper product, the paper web, or paper material may be reinforced with synthetic fibers, such as nylon or fiberglass, or impregnated with nonfibrous materials, such as plastics, polymers, resins, or lotions. As used herein, the terms "paper web" and "web"

are understood to include both forming and formed paper sheet materials, papers, and paper materials containing paper fibers. The paper product may be a coated, laminated, or composite paper material. The paper product can be bleached or unbleached.

Paper can include, but is not limited to, writing papers and printing papers (e.g., uncoated mechanical, total coated paper, coated free sheet, coated mechanical, uncoated free sheet, and the like), industrial papers, tissue papers of all varieties, paperboards, cardboards, packaging papers (e.g., unbleached kraft paper, bleached kraft paper), wrapping papers, paper adhesive tapes, paper bags, paper cloths, toweling, wallpapers, carpet backings, paper filters, paper mats, decorative papers, disposable linens and garments, and the like.

Paper can include tissue paper products. Tissue paper products include sanitary tissues, household tissues, industrial tissues, facial tissues, cosmetic tissues, soft tissues, absorbent tissues, medicated tissues, toilet papers, paper towels, paper napkins, paper cloths, paper linens, and the like. Common paper products include printing grade (e.g., newsprint, catalog, rotogravure, publication, banknote, document, bible, bond, ledger, stationery), industrial grade (e.g., bag, linerboard, corrugating medium, construction paper, greaseproof, glassine), and tissue grade (sanitary, toweling, condenser, wrapping).

In an exemplary embodiment, tissue paper may be a felt pressed tissue paper, a pattern densified tissue paper, or a high bulk, uncompacted tissue paper. In an exemplary embodiment, the tissue paper may be creped or uncreped, of a homogeneous or multilayered construction, layered or non-layered (blended), and one-ply, two-ply, or three or more plies. In an exemplary embodiment, tissue paper includes soft and absorbent paper tissue products that are consumer tissue products.

"Paperboard" is a paper that is thicker, heavier, and less flexible than conventional paper. Many hardwood and softwood tree species are used to produce paper pulp by mechanical and chemical processes that separate the fibers from the wood matrix. Paperboard can include, but is not limited to, semi-chemical paperboard, linerboards, containerboards, corrugated medium, folding boxboard, and cartonboards.

In an exemplary embodiment, paper refers to a paper product such as dry paper board, fine paper, towel, tissue, and newsprint products. Dry paper board applications include liner, corrugated medium, bleached, and unbleached dry paper board.

In an embodiment, paper can include carton board, container board, and special board/paper. Paper can include boxboard, folding boxboard, unbleached kraft board, recycled board, food packaging board, white lined chipboard, solid bleached board, solid unbleached board, liquid paper board, linerboard, corrugated board, core board, wallpaper base, plaster board, book bindery board, woodpulp board, sack board, coated board, gypsum board and the like.

"Pulp" refers to a fibrous cellulosic material. Suitable fibers for the production of the pulps are all conventional grades, for example mechanical pulp, bleached and unbleached chemical pulp, recycled pulp, and paper stocks obtained from all annuals. Mechanical pulp includes, for example, groundwood, thermomechanical pulp (TMP), chemothermochemical pulp (CTMP), groundwood pulp produced by pressurized grinding, semi-chemical pulp, high-yield chemical pulp and refiner mechanical pulp (RMP). Examples of suitable chemical pulps are sulfate, sulfite, and soda pulps. The unbleached chemical pulps, which are also referred to as unbleached kraft pulp, can be particularly used.

"Pulp slurry" refers to a mixture of pulp and water. The pulp slurry is prepared in practice using water, which can be partially or completely recycled from the paper machine. It can be either treated or untreated white water or a mixture of such water qualities. The pulp slurry may contain interfering substances (e.g., fillers). The filler content of paper may be up to about 40% by weight. Suitable fillers are, for example, clay, kaolin, natural and precipitated chalk, titanium dioxide, talc, calcium sulfate, barium sulfate, alumina, satin white or mixtures of the stated fillers.

"Papermaking process" is a method of making paper products from pulp comprising, inter alia, forming an aqueous pulp slurry that can include a cellulosic fiber, draining the pulp slurry to form a sheet, and drying the sheet. The steps of forming the papermaking furnish, draining, and drying may be carried out in any conventional manner generally known to those skilled in the art.

General Discussion

In various exemplary embodiments described herein, a paper material may be formed by treating a cellulosic fiber or an aqueous pulp slurry, with a paper strength system comprising a polyamine polyamidoamine epihalohydrin resin.

In an exemplary embodiment, the polyamine polyamidoamine epihalohydrin resin can include, for example, those made using one or more processes as described in U.S. application Ser. No. 13/074,469 and filed on Mar. 29, 2011, which is incorporated herein by reference in its entirety. In an exemplary embodiment, the polyamine polyamidoamine epihalohydrin resin can be the reaction product of three components: a polyamine, a polyamidoamine, and an epihalohydrin. In an exemplary embodiment, either or both of the polyamidoamine and the polyamine can include a primary or a secondary amine that can react with epihalohydrin. The epihalohydrin can cross-link the polyamidoamine and the polyamine during the reaction to form the polyamine polyamidoamine epihalohydrin resin, resulting in a branched polymeric structure.

In an exemplary embodiment, the polyamine can include an ammonium, an aliphatic amine, an aromatic amine, or a polyalkylene polyamine. In an exemplary embodiment, the polyalkylene polyamine can include a polyethylene polyamine, a polypropylene polyamine, a polybutylene polyamine, a polypentylene polyamine, a polyhexylene polyamine, or a mixture thereof. In an exemplary embodiment, the polyamine can include ethylene diamine (EDA), diethylenetriamine (DETA), triethylenetetramine (TETA), tetraethylenepentamine (TEPA), dipropylenetriamine (DPTA), bis-hexamethylenetriamine (BHMT), N-methylbis (aminopropyl)amine (MBAPA), aminoethyl-piperazine (AEP), pentaetehylenehexamine (PEHA), or a mixture thereof.

In an exemplary embodiment, the polyamidoamines can generally be prepared by reacting a polycarboxylic acid and/or a polycarboxylic acid derivative with one or more of the polyamines, such as, for example, those described above. The reactants may be heated to an elevated temperature, for example about 125 to 200° C. The reactants may be allowed to react for a predetermined time, for example about 1 to 10 hours. During the reaction, condensation water may be collected. The reaction may be allowed to proceed until the theoretical amount of water distillate is collected from the reaction. In an exemplary embodiment, the reaction may be conducted at atmospheric pressure.

In alternative embodiments, the reaction may proceed under a reduced pressure. Where a reduced pressure is employed, a lower temperature of about 75° C. to 180° C. may be utilized. At the end of this reaction, the resulting product may be dissolved in water at a concentration of about 20 to 90% by weight total polymer solids, or about 30 to 80% by weight total polymer solids, or about 40 to 70% by weight total polymer solids. In the preparation of the polyamidoamines, the molar ratio of the polyamine to the polycarboxylic acid and/or polycarboxylic acid derivative can be about 1.05 to 2.0.

In an exemplary embodiment, the polycarboxylic acid and/or polycarboxylic acid derivatives thereof (e.g., an ester of the polycarboxylic acid, an acid halide of the polycarboxylic acid, an acid anhydride of the polycarboxylic acid, and the like) can include malonic acid, glutaric acid, adipic acid, azelaic acid, citric acid, tricarballylic acid (1,2,3-propanetricarboxylic acid), 1,2,3,4-butanetetracarboxylic acid, nitrilotriacetic acid, N,N,N',N'-ethylenediaminetetraacetate, 1,2-cyclohexanedicarboxylic acid, 1,3-cyclohexanedicarboxylic acid, 1,4-cyclohexanedicarboxylic acid, phthalic acid, isophthalic acid, terephthalic acid, 1,2,4-benzenetricarboxylic acid (trimellitic acid), 1,2,4,5-benzenetetracarboxylic acid (pyromellitic acid), a carboxylate ester of any of these, an acid halide of any of these, an acid anhydride of any of these, or a mixture thereof.

In an exemplary embodiment, an ester of polycarboxylic acids can include dimethyl adipate, dimethyl malonate, diethyl malonate, dimethyl succinate, dimethyl glutarate and diethyl glutarate. In an exemplary embodiment, the acid anhydride can include succinic anhydride, maleic anhydride, N,N,N',N'-ethylenediaminetetraacetate dianhydride, phthalic anhydride, mellitic anhydride, pyromellitic anhydride, or a mixture thereof. In an exemplary embodiment, the acid halide can include adipoyl chloride, glutaryl chloride, sebacoyl chloride, or a mixture thereof.

In an exemplary embodiment, the polyamidoamine can have a molar ratio of polyalkylene polyamine to dicarboxylic acid of about 2:1 to 0.5:1, about 1.8:1 to 0.75:1, or about 1.6:1 to 0.85:1.

In an exemplary embodiment, the polyamidoamine resin can have a reduced specific viscosity of about 0.02 dL/g to 0.25 dL/g, about 0.04 dL/g to 0.20 dL/g, or about 0.06 dL/g to 0.18 dL/g. Reduced specific viscosity (RSV) can be measured using a glass capillary viscometer at 30° C. The efflux time of each sample can be determined three times and the average efflux time calculated. The RSV can be calculated using the following formula (1):

$$RSV = ((t - t_0))/(t_0 c) \quad (1)$$

where t is the average efflux time of the polyamidoamine sample diluted with 1 M NaCl solution, $t_0$ is the average efflux time of 1 M NaCl solution, c is the concentration of the diluted polyamidoamine sample, which is 5 g/dL.

In an exemplary embodiment, the epihalohydrin can be a difunctional crosslinker that is used to prepare the polyamine polyamidoamine epihalohydrin resin. In an exemplary embodiment, the epihalohydrin can include epichlorohydrin, epifluorohydrin, epibromohydrin, or epiiodohydrin, alkyl-substituted epihalohydrins, or a mixture thereof. In an exemplary embodiment, the difunctional crosslinker for preparing the polyamine polyamindoamine epihalohydrin resin is epichlorohydrin.

In an exemplary embodiment, the polyamine polyamidoamine epihalohydrin resin can generally be formed by reacting polyamine, polyamidoamine, and epihalohydrin, in an aqueous medium.

In an exemplary embodiment, the weight ratio of polyamine to polyamidoamine, can be about 1:100 to 100:1, about 1:50 to 50:1, or about 1:20 to 20:1. In an exemplary embodiment, the reaction temperature can be about 25 to 100° C., about 40 to 90° C., or about 50 to 80° C.

In an exemplary embodiment, the total solids of the polyamine polyamidoamine epihalohydrin resin can be about 5 to 80%, about 10 to 50%, or about 15 to 30%. In an exemplary embodiment, the pH values of the polyamine polyamidoamine epihalohydrin resin can be about 2 to 10, about 3 to 9, or about 3 to 8. In an exemplary embodiment, the weight average molecular weight of the polyamine polyamidoamine epihalohydrin resin can be about 350 Daltons (Da) to 10 million Da, about 1000 Da to 5 million Da, or about 5000 Da to 3 million Da. In an exemplary embodiment, the Brookfield viscosity of the polyamine polyamidoamine epihalohydrin resin can be about 3 to 1000 cps, about 5 to 500 cps, or about 8 to 300 cps, for a 20% by weight aqueous solution.

In an exemplary embodiment, the polyamine polyamidoamine epihalohydrin resin has an epihalohydrin/amine (also expressed herein as "epi/amine" or "E/N") ratio of about 0.8 or less, about 0.5 or less, about 0.45 or less, about 0.4 or less, or about 0.3 or less. The epi/amine ratio is calculated as the molar ratio of epichlorohydrin content to amine content. In an embodiment, the polyamine polyamidoamine epihalohydrin resin has an E/N ratio of about 0.01 to 0.8, about 0.01 to 0.5, about 0.01 to 0.45, about 0.01 to 0.4, or about 0.01 to 0.3.

In an exemplary embodiment, a paper strength system may include both an aldehyde-functionalized polymer resin and a polyamine polyamidoamine epihalohydrin resin (e.g., polyamine polyamidoamine epichlorohydrin (PPAE) resin).

In an exemplary embodiment, the aldehyde-functionalized polymer resin can be produced by reacting a polymer including one or more hydroxyl, amine, or amide groups with one or more aldehydes. In an exemplary embodiment, the polymeric aldehyde-functionalized polymer resin can comprise gloxylated polyacrylamides, aldehyde-rich cellulose, aldehyde-functional polysaccharides, or aldehyde functional cationic, anionic or non-ionic starches. Exemplary materials include those disclosed in U.S. Pat. No. 4,129,722, which is herein incorporated by reference. An example of a commercially available soluble cationic aldehyde functional starch is Cobond® 1000 marketed by National Starch. Additional exemplary aldehyde-functionalized polymers may include aldehyde polymers such as those disclosed in U.S. Pat. No. 5,085,736; U.S. Pat. No. 6,274,667; and U.S. Pat. No. 6,224,714; all of which are herein incorporated by reference, as well as the those of WO 00/43428 and the aldehyde functional cellulose described in WO 00/50462 A1 and WO 01/34903 A1. In an exemplary embodiment, the polymeric aldehyde-functional resins can have a molecular weight of about 10,000 Da or greater, about 100,000 Da or greater, or about 500,000 Da or greater. Alternatively, the polymeric aldehyde-functionalized resins can have a molecular weight below about 200,000 Da, such as below about 60,000 Da.

In an exemplary embodiment, further examples of aldehyde-functionalized polymers can include dialdehyde guar, aldehyde-functional wet strength additives further comprising carboxylic groups as disclosed in WO 01/83887, dialdehyde inulin, and the dialdehyde-modified anionic and amphoteric polyacrylamides of WO 00/11046, each of which are herein incorporated by reference. Another exemplary aldehyde-functionalized polymer is an aldehyde-containing surfactant such as those disclosed in U.S. Pat. No. 6,306,249, which is incorporated herein by reference.

When used in an exemplary embodiment, the aldehyde-functionalized polymer can have at least about 5 milliequivalents (meq) of aldehyde per 100 grams of polymer, more specifically at least about 10 meq, more specifically about 20 meq or greater, or most specifically about 25 meq, per 100 grams of polymer or greater.

In an exemplary embodiment, the polymeric aldehyde-functionalized polymer can be a glyoxylated polyacrylamide, such as a cationic glyoxylated polyacrylamide as described in U.S. Pat. No. 3,556,932, U.S. Pat. No. 3,556,933, U.S. Pat. No. 4,605,702, U.S. Pat. No. 7,828,934, and U.S. Patent Application 20080308242, each of which are incorporated herein by reference. Such compounds include FENNOBOND™ 3000 and PAREZ™ 745 from Kemira Chemicals of Helsinki, Finland, HERCOBOND™ 1366, manufactured by Hercules, Inc. of Wilmington, Del.

In an exemplary embodiment, the aldehyde functionalized polymer is a glyoxalated polyacrylamide resin having the ratio of the number of substituted glyoxal groups to the number of glyoxal-reactive amide groups being in excess of about 0.03:1, being in excess of about 0.10:1, or being in excess of about 0.15:1.

In an exemplary embodiment, the aldehyde functionalized polymer can be a glyoxalated polyacrylamide resin having a polyacrylamide backbone with a molar ratio of acrylamide to dimethyldiallylammonium chloride of about 99:1 to 50:50, about 98:1 to 60:40, or about 96:1 to 75:25. In an exemplary embodiment, the weight average molecular weight of the polyacrylamide backbone can be about 250,000 Da or less, about 150,000 Da or less, or about 100,000 Da or less. The Brookfield viscosity of the polyacrylamide backbone can be about 10 to 10,000 cps, about 25 to 5000 cps, about 50 to 2000 cps, for a 40% by weight aqueous solution.

In an exemplary embodiment, the weight ratio of the aldehyde-functionalized polymer resin to polyamine polyamidoamine epihalohydrin can be about 1:100 to 100:1, or about 1:50 to 50:1, or about 1:20 to 20:1. It should be noted in exemplary an embodiment the ratio can be modified to provide performance and/or cost characteristics, as necessary or desired.

In an exemplary embodiment, the paper strength system (e.g., either polyamine polyamidoamine epihalohydrin resin, or aldehyde functionalized polymer resin and polyamine polyamidoamine epihalohydrin resin) may be provided to a pulp slurry, which may be used to produce a paper product. As a result, the strength system is dispersed throughout the resultant paper product.

In an exemplary embodiment, the strength system (or a component thereof) can be applied as an aqueous solution(s) to a cellulosic web, fibrous slurry, or individual fibers. In addition to being applied as an aqueous solution, the strength system (or a component thereof) can also be applied in the form of a suspension, a slurry, or as a dry reagent depending upon the particular application. In one exemplary embodiment, PPAE and an aldehyde-functionalized polymer may be provided as a dry reagent, with sufficient water to permit interaction of the PPAE polymer with the molecules of the aldehyde functionalized polymer.

In an exemplary embodiment, a strength system including PPAE polymer and the aldehyde-functionalized polymer, the individual components may be combined first and then applied to a web or fibers, or the two components may be applied sequentially in either order. After the two components have been applied to the web, the web or fibers are dried and heatedly sufficiently to achieve the desired interaction between the two compounds.

By way of example only, application of the strength system (or a component thereof) can be applied by any of the following methods or combinations thereof.

In an exemplary embodiment, the method can include direct addition of the strength system (or a component thereof) to a fibrous slurry, such as by injection of the compound into a slurry prior to entry in the headbox. In an exemplary embodiment, the slurry can be about 0.1% to about 50%, about 0.2% to 10%, about 0.3% to about 5%, or about 0.4% to about 4%.

In an exemplary embodiment, the method can include spraying the strength system (or a component thereof) to a fibrous web. For example, spray nozzles may be mounted over a moving paper web to apply a desired dose of a solution to a web that can be moist or substantially dry.

In an exemplary embodiment, the method can include application of the strength system (or a component thereof) by spray or other means to a moving belt or fabric, which in turn contacts the tissue web to apply the chemical to the web, such as is disclosed in WO 01/49937.

In an exemplary embodiment, the method can include printing the strength system (or a component thereof) onto a web, such as by offset printing, gravure printing, flexographic printing, ink jet printing, digital printing of any kind, and the like.

In an exemplary embodiment, the method can include coating the strength system (or a component thereof) onto one or both surfaces of a web, such as blade coating, air knife coating, short dwell coating, cast coating, and the like.

In an exemplary embodiment, the method can include extrusion from a die head of the strength system (or a component thereof) in the form of a solution, a dispersion or emulsion, or a viscous mixture.

In an exemplary embodiment, the method can include application of strength system (or a component thereof) to individualized fibers. For example, comminuted or flash dried fibers may be entrained in an air stream combined with an aerosol or spray of the compound to treat individual fibers prior to incorporation into a web or other fibrous product.

In an exemplary embodiment, the method can include impregnation of a wet or dry web with a solution or slurry of strength system (or a component thereof), where the strength system (or a component thereof) penetrates a significant distance into the thickness of the web, such as about 20% or more of the thickness of the web, about 30% or more of the thickness of the web, and about 70% or more of the thickness of the web, including completely penetrating the web throughout the full extent of its thickness.

In an embodiment, the method for impregnation of a moist web can include the use of the Hydra-Sizer® system, produced by Black Clawson Corp., Watertown, N.Y., as described in "New Technology to Apply Starch and Other Additives," Pulp and Paper Canada, 100(2): T42-T44 (February 1999). This system includes a die, an adjustable support structure, a catch pan, and an additive supply system. A thin curtain of descending liquid or slurry is created which contacts the moving web beneath it. Wide ranges of applied doses of the coating material are said to be achievable with good runnability. The system can also be applied to curtain coat a relatively dry web, such as a web just before or after creping.

In an exemplary embodiment, the method can include a foam application of the strength system (or a component thereof) to a fibrous web (e.g., foam finishing), either for topical application or for impregnation of the additive into the web under the influence of a pressure differential (e.g., vacuum-assisted impregnation of the foam). Principles of foam application of additives such as binder agents are described in the following publications: F. Clifford, "Foam Finishing Technology: The Controlled Application of Chemicals to a Moving Substrate," *Textile Chemist and Colorist*, Vol. 10, No. 12, 1978, pages 37-40; C. W. Aurich, "Uniqueness in Foam Application," Proc. 1992 *Tappi Nonwovens Conference*, Tappi Press, Atlanta, Ga., 1992, pp. 15-19; W. Hartmann, "Application Techniques for Foam Dyeing & Finishing", *Canadian Textile Journal*, April 1980, p. 55; U.S. Pat. No. 4,297,860, and U.S. Pat. No. 4,773,110, each of which is herein incorporated by reference.

In an exemplary embodiment, the method can include padding of a solution containing the strength system (or a component thereof) into an existing fibrous web.

In an exemplary embodiment, the method can include roller fluid feeding of a solution of strength system (or a component thereof) for application to the web.

When applied to the surface of a paper web, an exemplary embodiment of the present disclosure may include the topical application of the paper strength system (e.g., the PPAE polymer and, optionally the aldehyde-functionalized polymer resin) can occur on an embryonic web prior to Yankee drying or through drying, and optionally after final vacuum dewatering has been applied.

In an exemplary embodiment, the application level of the paper strength system can be about 0.05% to about 10% by weight relative to the dry mass of the web for any of the paper strength system. In exemplary embodiment, the application level can be about 0.05% to about 4%, or about 0.1% to about 2%. Higher and lower application levels are also within the scope of the embodiments. In some embodiments, for example, application levels of from about 5% to about 50% or higher can be considered.

In an exemplary embodiment, the paper strength system when combined with the web or with cellulosic fibers can have any pH, though in many embodiments it is desired that the paper strength system is in solution in contact with the web or with fibers have a pH below about 10, about 9, about 8 or about 7, such as about 2 to about 8, about 2 to about 7, about 3 to about 6, and about 3 to about 5.5. Alternatively, the pH range may be about 5 to about 9, about 5.5 to about 8.5, or about 6 to about 8. These pH values can apply to the PPAE polymer prior to contacting the web or fibers, or to a mixture of the paper strength system in contact with the web or the fibers prior to drying.

In an exemplary embodiment, before the paper strength system is applied to an existing web, such as a moist embryonic web, the solids level of the web may be about 10% or higher (i.e., the web comprises about 10 grams of dry solids and 90 grams of water, such as about any of the following solids levels or higher: about 12%, about 15%, about 18%, about 20%, about 25%, about 30%, about 35%, about 40%, about 45%, about 50%, about 60%, about 75%, about 80%, about 90%, about 95%, about 98%, and about 99%, with exemplary ranges of about 30% to about 100% or about 65% to about 90%).

Ignoring the presence of chemical compounds other than the paper strength system and focusing on the distribution of the paper strength system in the web, one skilled in the art will recognize that the paper strength system (including components and/or derivatives thereof) can be distributed in a wide variety of ways. For example, the paper strength system may be uniformly distributed, or present in a pattern in the web, or selectively present on one surface or in one layer of a multilayered web. In multi-layered webs, the entire thickness of the paper web may be subjected to application of the paper strength system and other chemical treatments described herein, or each individual layer may be independently treated or untreated with the paper strength system and other chemical treatments of the present invention. In an exemplary embodiment, the paper strength system is predominantly applied to one layer in a multilayer web. Alternatively, at least one layer is treated with significantly less paper strength system than other layers. For example, an inner layer can serve as a treated layer with increased wet strength or other properties.

In an exemplary embodiment, the paper strength system may also be selectively associated with one of a plurality of fiber types, and may be adsorbed or chemisorbed onto the surface of one or more fiber types. For example, bleached kraft fibers can have a higher affinity for the paper strength system than synthetic fibers that may be present.

In an exemplary embodiment, certain chemical distributions may occur in webs that are pattern densified, such as the webs disclosed in any of the following U.S. Pat. No. 4,514,345; U.S. Pat. No. 4,528,239; U.S. Pat. No. 5,098,522; U.S. Pat. No. 5,260,171; U.S. Pat. No. 5,275,700; U.S. Pat. No. 5,328,565; U.S. Pat. No. 5,334,289; U.S. Pat. No. 5,431,786; U.S. Pat. No. 5,496,624; U.S. Pat. No. 5,500,277; U.S. Pat. No. 5,514,523; U.S. Pat. No. 5,554,467; U.S. Pat. No. 5,566,724; U.S. Pat. No. 5,624,790; and U.S. Pat. No. 5,628,876, the disclosures of which are incorporated herein by reference to the extent that they are non-contradictory herewith.

In an exemplary embodiment, the paper strength system or other chemicals can be selectively concentrated in the densified regions of the web (e.g., a densified network corresponding to regions of the web compressed by an imprinting fabric pressing the web against a Yankee dryer, where the densified network can provide good tensile strength to the three-dimensional web). This is particularly so when the densified regions have been imprinted against a hot dryer surface while the web is still wet enough to permit migration of liquid between the fibers to occur by means of capillary forces when a portion of the web is dried. In this case, migration of the aqueous solution of paper strength system can move the paper strength system toward the densified regions experiencing the most rapid drying or highest levels of heat transfer.

The principle of chemical migration at a microscopic level during drying is well attested in the literature. See, for example, A. C. Dreshfield, "The Drying of Paper," *Tappi Journal*, Vol. 39, No. 7, 1956, pages 449-455; A. A. Robertson, "The Physical Properties of Wet Webs. Part I," *Tappi Journal*, Vol. 42, No. 12, 1959, pages 969-978; U.S. Pat. No. 5,336,373, and U.S. Pat. No. 6,210,528, each of which is herein incorporated by reference.

Without wishing to be bound by theory, it is believed that chemical migration may occur during drying when the initial solids content (dryness level) of the web is below about 60% (e.g., less than any of about 65%, about 63%, about 60%, about 55%, about 50%, about 45%, about 40%, about 35%, about 30%, and about 27%, such as about 30% to 60%, or about 40% to about 60%). The degree of chemical migration can depend, for example, on the surface chemistry of the fibers, the chemicals involved, the details of drying, the structure of the web, and so forth. On the other hand, if the web with a solid contents below about 60% is through-dried to a high dryness level, such as at least any of about 60% solids, about 70% solids, and about 80% solids (e.g., from 65% solids to 99% solids, or from 70% solids to 87% solids), then regions of the web disposed above the deflection conduits (i.e., the bulky "domes" of the pattern-densified web) may have a higher concentration of paper strength system or other water-soluble chemicals than the densified regions, for drying will tend to occur first in the regions of the web through which air can readily pass, and capillary wicking can bring fluid from adjacent portions of the web to the regions where drying is occurring most rapidly. In short, depending on how drying is carried out, water-soluble reagents may be present at a relatively higher concentration (compared to other portions of the web) in the densified regions or the less densified regions ("domes").

The paper strength system (or components or derivatives thereof) may also be present substantially uniformly in the web, or at least without a selective concentration in either the densified or undensified regions.

According to an exemplary method, the conditions (e.g., temperature of the pulp slurry, temperature of pre-mixing the components, time of pre-mixing the components, concentration of the paper solution, co-mixing of solids, and the like) of the pulp slurry and process can vary, as necessary or desired, depending on the particular paper product to be formed, characteristics of the paper product formed, and the like. In an embodiment, the temperature of the pulp slurry can be about 10 to 80° C. when the strength system is added to the pulp slurry. In an embodiment, the process variables may be modified as necessary or desired, including, for example, the temperature of pre-mixing the components, the time of pre-mixing the components, and the concentration of the pulp slurry.

In various exemplary embodiments a paper may be formed by the treatment of a cellulosic fiber or an aqueous pulp slurry with a strength system as described herein. The paper can be formed using one or more methods, including those described herein.

EXAMPLES

Now having described the embodiments, in general, the examples describe some additional embodiments. While embodiments are described in connection with the examples and the corresponding text and figures, there is no intent to limit embodiments of the disclosure to these descriptions. On the contrary, the intent is to cover all alternatives, modifications, and equivalents included within the spirit and scope of exemplary embodiments.

Test Methods:

Dry Tensile Strength Test

Tensile strength is measured by applying a constant-rate-of-elongation to a sample and recording the force per unit width required to break a specimen. This procedure references TAPPI Test Method T494 (2001), which is incorporated herein by reference, and modified as described.

Initial Wet Tensile Strength Test

This test method is used to determine the initial wet tensile strength of paper or paperboard that has been in contact with water for 2 seconds. A 1-inch wide paper strip sample is placed in the tensile testing machine and wetted on both strip sides with distilled water by a paint brush. After the contact time of 2 seconds, the strip is elongated as set forth in 6.8-6.10 of TAPPI Test Method 494 (2001). The initial wet tensile is useful in the evaluation of the performance characteristics of tissue products, paper towels and other papers subjected to stress during processing or use while instantly wet. This method references U.S. Pat. No. 4,233,411, which are incorporated herein by reference, and modified as described.

Permanent Wet Tensile Strength Test

This test method is used to determine the wet tensile strength of paper or paperboard that has been in contact with water for an extended period of 30 minutes. A 1-inch wide paper strip sample is soaked in water for 30 minutes and is placed in the tensile testing machine. The strip is elongated as set forth in 6.8-6.10 of TAPPI Test Method 494 (2001). A low permanent wet tensile strength indicates that the paper product can be repulped in water without significant mechanical energy or dispersed in water easily without clogging sewage systems.

Wet Tensile Decay

Wet tensile decay is the percentage of wet tensile loss of the handsheet after being soaked in water for an extended period of time. The calculation may be expressed as the following formula (2):

$$\Delta T\% = (T_i - T_p)/T_i \tag{2}$$

where $\Delta T\%$ is the wet tensile decay, $T_i$ is the initial wet tensile strength as measured using the method above, and $T_p$ is the permanent wet tensile as measured using the method above.

Handsheet Preparation

In the following examples, handsheets were prepared using a pulp mixture of bleached hardwood and bleached softwood. Deionized water was used for furnish preparation, and an additional 150 ppm of sodium sulfate and 35 ppm of calcium chloride were added. While mixing with an overhead agitator, a batch of 0.6% solids containing 8.7 g of cellulose fibers was treated with various strength agent samples (described below) that were diluted to 1% weight % with deionized water. After the addition of the strength agent, the pulp slurry was mixed for 30 seconds. Then, four 3-g sheets of paper were formed using a standard (8"×8") Nobel & Woods handsheet mold, to target a basis weight of 52 lbs/3000 ft². The handsheets were pressed between felts in the nip of a pneumatic roll press at about 15 psig and dried on a rotary dryer at 110° C. The paper samples were oven cured for 10 minutes at the temperature of 110° C., then conditioned in the standard TAPPI control room for overnight.

Examples 1-4: Preparation of Polyamidoamines

Polyamidoamine was first prepared by a condensation reaction of an excess amount of diethylenetriamine with adipic acid. In particular, diethylenetriamine was added to a three neck flask. Adipic acid was then slowly added to the flask and the reaction mixture heated to 165-170° C. and maintained for a period of 5 hours. At the end of the reaction, the product was diluted with water to adjust the concentration to 60% and the temperature was lowered to room temperature. Table 1 shows the charge ratios of diethylenetriamine and adipic acid.

TABLE 1

| Charge ratios of polyamidoamines of Examples 1-4 | |
|---|---|
| Example | Diethylenetriamine/adipic acid molar ratio |
| 1 | 1.4 |
| 2 | 1.6 |
| 3 | 1.8 |
| 4 | 1.0 |

Examples 5-17: Preparation of PPAE Resins

Polyamidoamine polyamine and water were first added to a one liter reactor with reflux. The reactor was heated to 70° C. and maintained at this temperature throughout the reaction. Epichlorohydrin was then added to the reactor slowly to increase product viscosity. Water was added stepwise during the reaction to reduce the viscosity buildup rate to avoid product gelation. Once the product reached the desired viscosity range, a final charge of water was added to the reactor and the pH was adjusted to around 5.0 using concentrated sulfuric acid (95%). The total solids of the products were around 15%. Table 2 shows the charge ratios and properties of the PPAE products.

TABLE 2

Charge ratios and properties of PPAE resins

| Ex. No. | Polyamidoamine | Polyamine | Polyamine/ polyamidoamine weight ratio | pH | Brookfield viscosity at 23° C. (cP) |
|---|---|---|---|---|---|
| 5 | Example 1 | TETA | 0.22 | 5.0 | 24 |
| 6 | Example 1 | TETA | 0.22 | 5.0 | 55 |
| 7 | Example 1 | TETA | 0.22 | 5.0 | 95 |
| 8 | Example 2 | DETA | 0.07 | 4.9 | 24 |
| 9 | Example 2 | DETA | 0.07 | 4.9 | 52 |
| 10 | Example 2 | DETA | 0.07 | 4.9 | 69 |
| 11 | Example 2 | DETA | 0.07 | 5.0 | 96 |
| 12 | Example 3 | DETA | 0.07 | 5.0 | 26 |
| 13 | Example 3 | DETA | 0.07 | 5.0 | 82 |
| 14 | Example 3 | DETA | 0.07 | 5.0 | 96 |
| 15 | Example 3 | TETA | 0.24 | 5.0 | 5 |
| 16 | Example 3 | TETA | 0.24 | 5.0 | 26 |
| 17 | Example 3 | TETA | 0.24 | 5.0 | 92 |

Comparative Examples A-J: PAE Resins

Polyamidoamine and water were added to a one liter reactor with reflux. The reactor was heated to 70° C. and maintained at this temperature throughout the reaction. Epichlorohydrin was then added to the reactor slowly to increase product viscosity. Water was added stepwise during the reaction to reduce viscosity buildup rate to avoid product gelation. Once the product reached the desired viscosity range, the final charge of water was added to the reactor and the pH was adjusted to around 5.0 using concentrated sulfuric acid (95%). The total solids of the products were around 15%. Table 3 shows the charge ratios and properties of the Comparative Examples. The Omnicrepe 681 AX adhesive referenced in Table 3 below was a commercial creping adhesive product available from Kemira Chemicals.

TABLE 3

Charge ratios and properties of comparative examples A-J

| Comparative Examples | Polyamidoamine | DETA/adipic acid molar ratio | pH | Brookfield viscosity at 23° C. (cP) |
|---|---|---|---|---|
| A | Example 1 | 1.4 | 5.0 | 23 |
| B | Example 1 | 1.4 | 5.0 | 64 |
| C | Example 3 | 1.8 | 5.0 | 7 |
| D | Example 3 | 1.8 | 5.0 | 40 |
| E | Example 3 | 1.8 | 5.0 | 93 |
| F | Example 2 | 1.6 | 5.0 | 37 |
| G | Example 2 | 1.6 | 5.0 | 97 |
| H | Example 2 | 1.6 | 5.0 | 140 |
| J | Example 4 | 1.0 | 4.0 | 90 |
| Omnicrepe 681 AX | | ~1.0 | 4.0 | |

Calculation of the Epichlorohydrin-Reactive Sites on Polyamidoamine

The polyamidoamine samples contain both primary amine groups and secondary amine groups. It is commonly accepted that each secondary amine group reacts with one epichlorohydrin molecule, whereas each primary amine group reacts with two epichlorohydrin molecules. Therefore, the total number of epichlorohydrin-reactive sites in a polyamidoamine may be expressed as follows:

$$N = a1 + 2 \times a2 \tag{3}$$

N is the molar quantity of epichlorohydrin-reactive sites, a1 is the molar quantity of secondary amine groups, and a2 is the molar quantity of primary amine groups. a1 and a2 may be expressed as follows:

$$a1 = n\frac{m1}{MW2} \tag{4}$$

$$a2 = \left(\frac{m1}{MW1} - \frac{m2}{MW2}\right) \times 2 \tag{5}$$

where m1 is the mass of polyamine used to prepare the polyamidoamine sample, m2 is the mass of dicarboxylic acid and/or its derivative used to prepare the polyamidoamine sample, MW1 is the formula weight of polyamine, MW2 is the formula weight of dicarboxylic acid or its derivative and n is the number of secondary amines in the polyamine Calculation of Reduced Specific Viscosity of Polyamidoamine Reduced specific viscosity (RSV) was measured using a glass capillary viscometer at 30° C. The efflux time of each sample was determined three times and the average efflux time was calculated. The RSV was calculated according to the following formula (6)

$$RSV = (t - t_0)/(t_0 c) \tag{6}$$

where t is the average efflux time of the polyamidoamine sample diluted with 1 M NaCl solution, $t_0$ is the average efflux time of 1 M NaCl solution, c is the concentration of the diluted polyamidoamine sample, which was 5 wt %.

Figure 1:
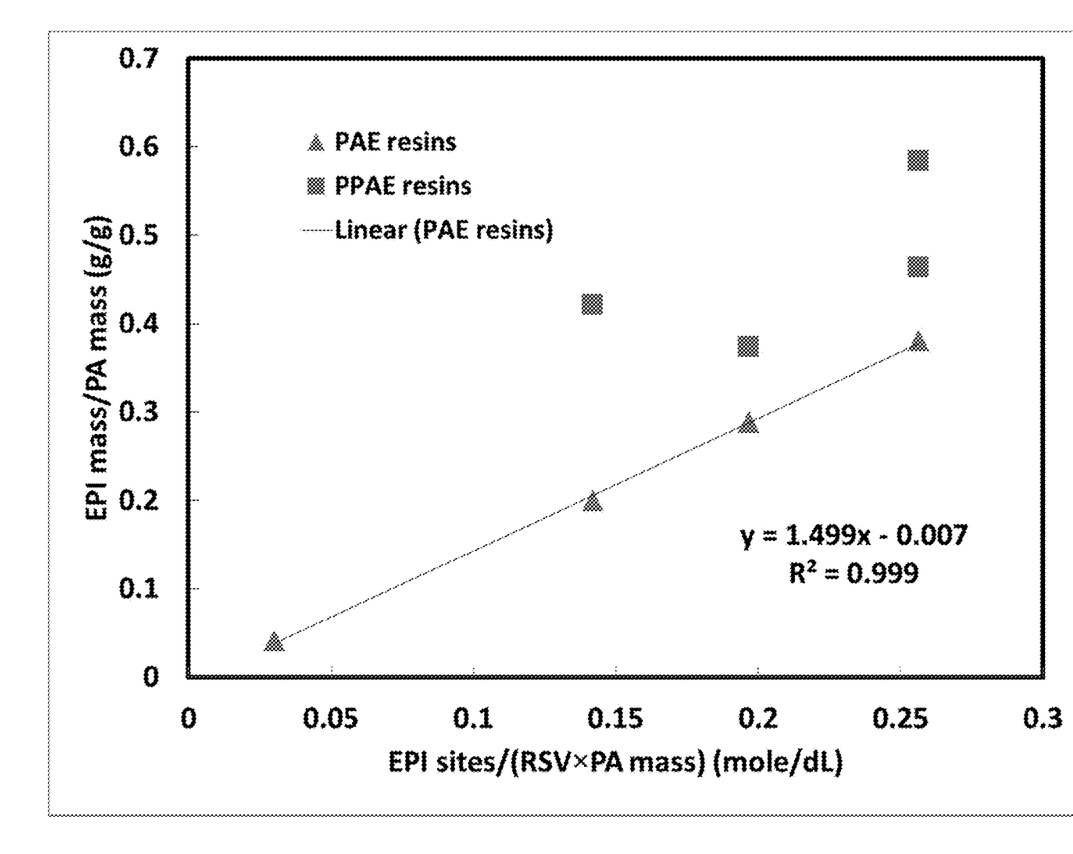
FIG. 1 graphically illustrates correlation between the molar quantity of epichlorohydrin-reactive sites on polyamidoamine and the molar quantity of charged epichlorohydrin.

Table 4 lists the active polyamidoamine mass (PA mass), the calculated molar quantities of epichlorohydrin-reactive sites on polyamidoamine (EPI sites), the RSVs of the polyamidoamine samples (RSV), and also the mass quantities of charged epichlorohydrin to increase sample final viscosity above 50 cps at 23° C. (EPI mass). As shown in FIG. 1, the x-axis is the ratio of EPI sites over the product of RSV and PA mass, the y-axis is the ratio of EPI mass over PA mass. For four PAE resins, the correlation between the x-axis and y-axis is linear with a $R^2$ of 0.999. In contrast, the data points for the PPAE resins show a complex non-linear correlation and do not fit the PAE linear correlation. Furthermore, the data points of the PPAE resins are all above the fitted line for the PAE resins, suggesting that a greater amount of epichlorohydrin is required to achieve the desired viscosity range compared to the PAE resins. Theoretically, the ratio of EPI mass over PA mass (y-axis) of the PPAE resins will become infinitely large when the ratio of PA mass over extra polyamine mass becomes infinitely small. Overall, these differences demonstrate that the molecular structure of the PPAE resins is fundamentally different from that of the PAE resins.

TABLE 4

Properties of PAE and PPAE Strength Systems

| Strength System: | Chemistry | Backbone DETA/ Adipic acid molar ratio | PA mass (g) | EPI sites (mole) | RSV (dL/g) | EPI mass (g) |
|---|---|---|---|---|---|---|
| Comparative Example B | PAE | 1.4 | 107.7 | 1.27 | 0.083 | 21.5 |
| Comparative Example E | PAE | 1.8 | 77.0 | 1.30 | 0.066 | 29.3 |
| Comparative Example G | PAE | 1.6 | 53.6 | 0.781 | 0.074 | 15.4 |
| Comparative Example J | PAE | 1.0 | 129.6 | 0.608 | 0.156 | 5.3 |
| Example 7 | PPAE | 1.4 | 58.2 | 0.690 | 0.083 | 24.5 |
| Example 11 | PPAE | 1.6 | 68.7 | 1.00 | 0.074 | 25.6 |
| Example 14 | PPAE | 1.8 | 87.2 | 1.48 | 0.066 | 40.4 |
| Example 17 | PPAE | 1.8 | 82.6 | 1.40 | 0.066 | 48.2 |

Examples 18-24: Evaluation of Paper Strength Systems at 0 ppm Alkalinity

In these examples, the performance of paper strength systems including the PPAE resin of Example 10 (alone, and in combination with a commercial GPAM product FENNOBOND 3000 from Kemira Chemicals) was compared to the performance of other comparative strength systems at 0 ppm alkalinity. Handsheets were prepared as described above, at a pH of 8, and treated with the dosage of the strength system as described in Table 5, below. Wetres 4063 was a commercial PAE resin from Kemira Chemicals.

TABLE 5

Paper Strength Systems - Examples 18-24

| Example No. | Strength system Component A | Amt of Component A | Strength System Component B | Amt of Component B | Premixed or Sequentially added |
|---|---|---|---|---|---|
| 18 | None | N/A | None | N/A | N/A |
| 19 | GPAM (FB 3000) | 8 lb/ton | None | N/A | N/A |
| 20 | PAE (Wetres 4063) | 8 lb/ton | None | N/A | N/A |
| 21 | PPAE (Example 10) | 8 lb/ton | None | N/A | N/A |
| 22 | PPAE (Example 10) | 2 lb/ton | GPAM (FB 3000) | 6 lb/ton | Premixed |
| 23 | PPAE (Example 10) | 2 lb/ton | GPAM (FB 3000) | 6 lb/ton | Sequential-PPAE followed by GPAM |
| 24 | PAE (Wetres 4063) | 2 lb/ton | GPAM (FB 3000) | 6 lb/ton | Premixed |

The dry tensile strength, initial wet tensile strength, and permanent wet tensile strength, properties of each sample were measured, in accordance with the methods described above. The results are summarized in Table 6, below.

TABLE 6

Performance of Paper strength systems at 0 ppm alkalinity

| Example No. | Dry tensile strength (lb/in) | Dry tensile strength increase (%) - relative to Control (Ex. 18) | Initial wet tensile strength (lb/in) | Permanent wet tensile strength (lb/in) | Wet tensile strength decay (%) | Permanent wet/dry ratio (%) |
|---|---|---|---|---|---|---|
| 18 (control) | 21.6 | N/A | 0.9 | 0.4 | 56 | 1.9 |
| 19 (GPAM) | 25.5 | 18.1 | 3.1 | 1.9 | 39 | 7.5 |
| 20 (PAE) | 30.0 | 38.9 | 8.6 | 6.9 | 20 | 23 |
| 21 (PPAE) | 26.5 | 22.7 | 3.4 | 3.1 | 8.8 | 12 |
| 22 (PPAE + GPAM) | 27.7 | 28.2 | 4.1 | 2.9 | 29 | 11 |
| 23 (PPAE + GPAM) | 28.1 | 30.1 | 4.8 | 3.2 | 33 | 11 |
| 24 (PAE + GPAM) | 28.9 | 33.8 | 5.8 | 4.4 | 24 | 15 |

Dry tensile strength, wet tensile strength decay, and permanent wet/dry ratio are three performance indicators for strength of bath tissue paper product. For example, high dry tensile strength indicates a strong tissue product. High wet tensile strength decay, low permanent wet tensile strength, and low permanent wet/dry ratio indicate good re-pulpability and water dispersibility of the paper products.

As shown in Table 6, above, the GPAM-only strength system of Example 19 provided a dry tensile strength increase of only about 18%, and a low permanent wet tensile strength of about 1.9 lb/in at pH=8.0. In comparison, the PAE-only strength system of Example 20 provided a significant dry tensile strength increase of about 39%, but also resulted in a high permanent wet tensile strength of about 6.9 lb/in and a high permanent wet/dry ratio of about 23%, indicating poor re-pulpability and water dispersability. In comparison, the PPAE-only strength system of Example 21 provided a lower dry tensile strength (about 23% increase over control), in combination with a relatively low permanent wet tensile strength (about 3.1 lb/in). This is an improvement over the GPAM-only and PAE-only systems. Furthermore, the strength system including a combination of PPAE and GPAM (Examples 22-23) led to both high dry tensile strength and high wet tensile strength decay of the treated papers. For example, the strength system of Example 23 provided a dry tensile strength increase of about 30%, considerably higher than GPAM alone. The wet tensile decay was about 33% which was comparable to the papers treated by GPAM alone.

Examples 25-30: Evaluation of Paper Strength Systems at 100 ppm Alkalinity

In these examples, the performance of paper strength systems including the PPAE resin of Example 10 (alone, and in combination with a commercial GPAM product FB 3000 from Kemira Chemicals) was compared to the performance of other comparative strength systems at 100 ppm alkalinity.

High levels of alkalinity are known to adversely affect the performance of many strength additives, including GPAM resins. Handsheets were prepared as described above, at a pH of 8, and treated with the dosage of strength system described in Table 7, below.

TABLE 7

Paper Strength Systems - Examples 25-30

| Example | Strength system Component A | Amt of Component A | Strength System Component B | Amt of Component B | Premixed or Sequentially added |
|---|---|---|---|---|---|
| 25 | None | N/A | None | N/A | N/A |
| 26 | GPAM (FB 3000) | 8 lb/ton | None | N/A | N/A |
| 27 | PAE (Wetres 4063) | 8 lb/ton | None | N/A | N/A |
| 28 | PPAE (Example 10) | 8 lb/ton | None | N/A | N/A |
| 29 | PPAE (Example 10) | 2 lb/ton | GPAM (FB 3000) | 6 lb/ton | Premixed |
| 30 | PAE (Wetres 4063) | 2 lb/ton | GPAM (FB 3000) | 6 lb/ton | Premixed |

The dry tensile strength and initial wet strength tensile properties of each sample were measured, in accordance with the methods described above. The results are summarized in Table 8.

TABLE 8

Performance of Paper strength systems at 100 ppm alkalinity

| Example | Dry tensile strength (lb/in) | Dry tensile strength increase (%)- relative to Control (Ex. 25) | Initial wet strength tensile (lb/in) | Permanent wet tensile strength (lb/in) | Wet tensile strength decay (%) | Permanent wet/dry ratio (%) |
|---|---|---|---|---|---|---|
| 25 (Control) | 23.1 | N/A | 1.0 | 0.2 | 80 | 0.87 |
| 26 (GPAM) | 22.7 | 0 | 1.0 | 0.3 | 70 | 1.3 |
| 27 (PAE) | 31.1 | 34.6 | 8.4 | 7.4 | 12 | 24 |
| 28 (PPAE) | 24.8 | 7.4 | 3.6 | 2.7 | 25 | 11 |
| 29 (PPAE + GPAM) | 26.6 | 15.2 | 1.8 | 1.3 | 28 | 4.9 |
| 30 (PAE + GPAM) | 28.2 | 22.1 | 4.6 | 3.8 | 17 | 13 |

The results found in the Table 8 indicate that at high alkalinity (100 ppm, pH=8), the strength system including a combination of PPAE and GPAM (Example 29) provided improved dry tensile strength with low permanent wet tensile strength. The dry strength increase was about 15%, the permanent wet tensile strength was about 1.3 lb/in, and permanent wet/dry ratio was only about 4.9%.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of this disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

We claim at least the following:

1. A paper formed by a method comprising:
   treating a cellulosic fiber with a strength system comprising a polyamine polyamidoamine epichlorohydrin resin and an aldehyde functionalized resin; and
   forming the paper,
   wherein the polyamine polyamidoamine epichlorohydrin resin has an epi/amine ratio of less than 0.5 calculated as per moles per epichlorohydrin vs. the number of available primary and secondary amines of the polyamidoamine polymer; and
   wherein the polyamine polyamidoamine epichlorohydrin resin has a weight average molecular weight of 350 Daltons (Da) to 10 million Da, and
   wherein the weight ratio of aldehyde-functionalized polymer resin to polyamine polyamidoamine epichlorohydrin resin is from about 1:14 to about 14:1.

2. The paper of claim 1, wherein the paper is a paper product that is selected from the group consisting of a dry paper board, a fine paper, a towel, a tissue, and a newsprint product.

3. The paper of claim 1, wherein the paper has a higher dry strength as compared to a paper that has not been treated with the strength system.

4. The paper of claim 1, wherein the paper has a higher permanent wet strength as compared to a paper that has not been treated with the strength system.

5. The paper of claim 1, wherein the polycarboxylic acid and the polycarboxylic acid derivative are independently selected from the group consisting of: malonic acid, glutaric acid, adipic acid, azelaic acid, citric acid, tricarballylic acid (1,2,3-propanetricarboxylic acid), 1,2,3,4 butanetetracarboxylic acid, nitrilotriacetic acid, N,N,N',N'-ethylenediaminetetraacetate, 1,2-cyclohexanedicarboxylic acid, 1,3-cyclohexanedicarboxylic acid, 1,4-cyclohexanedicarboxylic acid, itaconic acid, phthalic acid, isophthalic acid, terephthalic acid, 1,2,4-benzenetricarboxylic acid (trimellitic acid), 1,2,4,5-benzenetetracarboxylic acid (pyromellitic acid), dimethyl adipate, dimethyl malonate, diethyl malonate, dimethyl succinate, dimethyl glutarate, diethyl glutarate, succinic anhydride, maleic anhydride, N,N,N',N'-ethylenediaminetetraacetate dianhydride, phthalic anhydride, mellitic anhydride, pyromellitic anhydride, adipoyl chloride, glutaryl chloride, sebacoyl chloride, and a mixture thereof.

6. The paper of claim 1, wherein the first polyamine and the second polyamine are independently selected from the group consisting of: ammonium, urea, aliphatic amines, aromatic amines, ethylene diamine (EDA), diethylenetriamine (DETA), triethylenetetramine (TETA), tetraethylenepentamine (TEPA), dipropylenetriamine (DPTA), bis-hexamethylenetriamine (BHMT), N-methylbis(aminopropyl)amine (MBAPA), aminoethyl-piperazine (AEP), pentaethylenehexamine (PEHA), and a mixture thereof.

7. The paper of claim 1, wherein the polyamine polyamidoamine epichlorohydrin resin has an epi/amine ratio of 0.01 to 0.40 calculated as moles per epichlorohydrin vs. the number of available primary and secondary amines of the polyamidoamine polymer.

8. The paper of claim 1, wherein the polyamine polyamidoamine epichlorohydrin resin has an epi/amine ratio of 0.01 to 0.45 calculated as moles per epichlorohydrin vs. the number of available primary and secondary amines of the polyamidoamine polymer.

9. A method of making a paper, comprising:
introducing to a cellulosic fiber a strength system comprising a polyamine polyamidoamine epichlorohydrin resin and an aldehyde-functionalized polymer resin, and
forming the paper,
wherein the polyamine polyamidoamine epichlorohydrin resin is the reaction product of: a polyamidoamine, a first polyamine, and an epichlorohydrin; wherein the polyamidoamine is prepared by a process comprising reacting a polycarboxylic acid, a polycarboxylic acid derivative, or a combination thereof with a second polyamine to form the polyamidoamine, wherein a molar ratio of the second polyamine to the polycarboxylic acid, polycarboxylic acid derivative, or combination thereof, is about 1.05 to about 2.0;
wherein the polyamine polyamidoamine epichlorohydrin resin has an epi/amine ratio of less than 0.5 calculated as moles per epichlorohydrin vs. the number of available primary and secondary amines of the polyamidoamine;
wherein the polyamine polyamidoamine epichlorohydrin resin has a weight average molecular weight of 350 Daltons (Da) to 10 million Da, and
wherein the weight ratio of aldehyde-functionalized polymer resin to polyamine polyamidoamine epichlorohydrin resin is from about 1:14 to about 14:1.

10. The method of claim 9, wherein the paper is a paper product that is selected from the group consisting of a dry paper board, a fine paper, a towel, a tissue, and a newsprint product.

11. The method of claim 9, wherein the aldehyde-functionalized polymer resin and the polyamine polyamidoamine epichlorohydrin resin are mixed together prior to being mixed with the pulp slurry.

12. The method of claim 9, wherein the aldehyde-functionalized polymer resin and the polyamine polyamidoamine epichlorohydrin resin are added to the cellulosic fiber simultaneously.

13. The method of claim 9, wherein the aldehyde-functionalized polymer resin and the polyamine polyamidoamine epihalohydrin epichlorohydrin resin are added to the cellulosic fiber sequentially.

14. The method of claim 9, wherein the aldehyde-functionalized polymer resin is added either directly to a pulp slurry or is sprayed on a paper web before drying the paper web.

15. The method of claim 9, wherein the polyamine polyamidoamine epichlorohydrin resin is added either directly to a pulp slurry or is sprayed on a paper web before drying the paper web.

16. The method of claim 9, wherein the polycarboxylic acid and the polycarboxylic acid derivative are independently selected from the group consisting of: malonic acid, glutaric acid, adipic acid, azelaic acid, citric acid, tricarballylic acid (1,2,3-propanetricarboxylic acid), 1,2,3,4 butanetetracarboxylic acid, nitrilotriacetic acid, N,N,N',N'-ethylenediaminetetraacetate, 1,2-cyclohexanedicarboxylic acid, 1,3-cyclohexanedicarboxylic acid, 1,4-cyclohexanedicarboxylic acid, itaconic acid, phthalic acid, isophthalic acid, terephthalic acid, 1,2,4-benzenetricarboxylic acid (trimellitic acid), 1,2,4,5-benzenetetracarboxylic acid (pyromellitic acid), dimethyl adipate, dimethyl malonate, diethyl malonate, dimethyl succinate, dimethyl glutarate, diethyl glutarate, succinic anhydride, maleic anhydride, N,N,N',N'-ethylenediaminetetraacetate dianhydride, phthalic anhydride, mellitic anhydride, pyromellitic anhydride, adipoyl chloride, glutaryl chloride, sebacoyl chloride, and a mixture thereof.

17. The method of claim 9, wherein the first polyamine and the second polyamine are independently selected from the group consisting of: ammonium, urea, aliphatic amines, aromatic amines, ethylene diamine (EDA), diethylenetriamine (DETA), triethylenetetramine (TETA), tetraethylenepentamine (TEPA), dipropylenetriamine (DPTA), bis-hexamethylenetriamine (BHMT), N-methylbis(aminopropyl)amine (MBAPA), aminoethyl-piperazine (AEP), pentaethylenehexamine (PEHA), and a mixture thereof.

18. The method of claim 9, wherein the polyamine polyamidoamine epichlorohydrin resin has an epi/amine ratio of 0.01 to 0.40 calculated as moles per epichlorohydrin vs. the number of available primary and secondary amines of the polyamidoamine polymer.

19. The method of claim 9, wherein the polyamine polyamidoamine epichlorohydrin resin has an epi/amine ratio of 0.01 to 0.45 calculated as moles per epichlorohydrin vs. the number of available primary and secondary amines of the polyamidoamine polymer.

* * * * *